(12) United States Patent
Wills et al.

(10) Patent No.: US 12,278,478 B2
(45) Date of Patent: Apr. 15, 2025

(54) OVERVOLTAGE PROTECTION OF ACCELERATOR COMPONENTS

(71) Applicant: Neutron Therapeutics LLC, Danvers, MA (US)

(72) Inventors: Tyler R. Wills, Danvers, MA (US); William H. Park, Marblehead, MA (US)

(73) Assignee: Neutron Therapeutics LLC, Danvers, MA (US)

( * ) Notice: Subject to any disclaimer, the term of this patent is extended or adjusted under 35 U.S.C. 154(b) by 173 days.

(21) Appl. No.: 17/998,572

(22) PCT Filed: May 12, 2021

(86) PCT No.: PCT/US2021/031896
§ 371 (c)(1),
(2) Date: Nov. 11, 2022

(87) PCT Pub. No.: WO2021/231514
PCT Pub. Date: Nov. 18, 2021

(65) Prior Publication Data
US 2023/0208130 A1    Jun. 29, 2023

Related U.S. Application Data

(60) Provisional application No. 63/024,102, filed on May 13, 2020.

(51) Int. Cl.
*H05H 5/00* (2006.01)
*H02H 7/00* (2006.01)
(Continued)

(52) U.S. Cl.
CPC .............. *H02H 7/003* (2013.01); *H05H 5/04* (2013.01); *H05H 5/06* (2013.01); *H05H 2242/22* (2021.05)

(58) Field of Classification Search
CPC .. H05H 5/03; H05H 5/04; H05H 5/06; H05H 9/00; H05H 7/22; H05H 2242/22; H01J 37/32027
See application file for complete search history.

(56) References Cited

U.S. PATENT DOCUMENTS

| | | | |
|---|---|---|---|
| 3,218,562 A | 11/1965 | Serduke | |
| 4,016,499 A | 4/1977 | Budker et al. | |

(Continued)

FOREIGN PATENT DOCUMENTS

| | | | |
|---|---|---|---|
| DE | 4019822 A1 | 1/1991 | |
| JP | 61-085100 | * 4/1986 | |

(Continued)

OTHER PUBLICATIONS

Office Action from Japanese Patent application No. 2022-568969, dated Sep. 5, 2023 (English version), 5 pages.*

(Continued)

*Primary Examiner* — Tuan T Lam
(74) *Attorney, Agent, or Firm* — DLA PIPER LLP (US)

(57) ABSTRACT

An over-voltage protection system for an accelerator can include: a plurality of DC power supplies configured to provide a plurality of voltage levels up to a desired voltage level; and an acceleration tube electrically connected to the plurality of DC power supplies and configured to accelerate a charged particle. The acceleration tube can include a plurality of stages. Each stage can include a plurality of electrodes and a plurality of varistors configured to discharge energy in response to an overvoltage event. One electrode of the plurality of electrodes can be electrically coupled to a voltage level of the plurality of voltage levels. The plurality of electrodes and the plurality of varistors can be electrically coupled to each other and arranged in an alternating fashion.

18 Claims, 13 Drawing Sheets

(51) Int. Cl.
*H05H 5/04* (2006.01)
*H05H 5/06* (2006.01)

(56) References Cited

U.S. PATENT DOCUMENTS

| | | | |
|---|---|---|---|
| 4,665,458 | A | 5/1987 | Matsuoka et al. |
| 5,175,506 | A | 12/1992 | Parsons |
| 7,777,194 | B2 | 8/2010 | Morita et al. |
| 8,723,452 | B2 * | 5/2014 | Ryding ............ H05H 5/04 315/506 |
| 9,750,122 | B1 | 8/2017 | Elizondo-Decanini |
| 9,784,785 | B2 * | 10/2017 | Farquhar, III ....... H02H 1/0007 |
| 9,941,090 | B2 * | 4/2018 | Hadland ............ H05G 1/12 |
| 10,003,256 | B2 * | 6/2018 | Gould ............... E21B 47/00 |
| 2008/0224064 | A1 | 9/2008 | Morita et al. |
| 2012/0112872 | A1 * | 5/2012 | Kang .................. H01C 7/108 338/21 |
| 2012/0146554 | A1 * | 6/2012 | Smick ................ H05H 5/04 310/112 |
| 2012/0146555 | A1 | 6/2012 | Ryding et al. |

FOREIGN PATENT DOCUMENTS

| | | |
|---|---|---|
| JP | 61-85100 | 4/1986 |
| JP | 2013-545255 | 12/2013 |
| JP | 2018-073680 | * 5/2018 |
| JP | 2018-73680 | 5/2018 |
| JP | 2020-506505 | 2/2020 |
| TW | 201931716 | 8/2019 |
| WO | 2015046125 | 4/2015 |

OTHER PUBLICATIONS

Notice of Allowance for Japanese Patent Application No. 2022-568969, mailed May 14, 2024, 5 pages.
Office Action from KR Application No. 10-2022-7043392, mailed Mar. 18, 2024, 9 pages.
Office Action from Japanese Patent Application No. 2022-568969, dated Dec. 5, 2023, 5 pages.
PCT International Application No. PCT/US21/31896, International Search Report and Written Opinion of the International Searching Authority, dated Sep. 14, 2021, 8 pages.
Extended European Search Report for Application No. 21803357.9, dated Apr. 18, 2024, 5 pages.

* cited by examiner

OVERVOLTAGE PROTECTION OF ACCELERATOR COMPONENTS

CROSS-REFERENCE TO RELATED APPLICATIONS

This application is a National Stage of PCT/US2021/031896, filed May 12, 2021, which claims priority to U.S. Provisional Patent Application No. 63/024,102 filed on May 13, 2020, which are incorporated by reference in their entireties.

BACKGROUND

Accelerators are used in a wide variety of fields that have needs for high-energy particle beams or ions. Such fields include medical applications like radiotherapy or neutron capture therapy, ion implantation, industrial processing, biomedical uses, and nuclear physics research. But whether the application is research-based or industry-based, accelerators typically involve high voltages, electrically sensitive components and thus a susceptibility to electrical breakdown.

Insulating materials are often used to surround, isolate and protect sensitive electrical components. However, these materials can experience electrical breakdown and/or electrical flashover due to overvoltages. Electrical breakdown occurs when current flows through an insulator at a voltage that exceeds the breakdown voltage of the material. This may damage the material and/or cause it to become more electrically conductive, removing the layer of isolation from the sensitive electrical components. Without the layer of isolation, sensitive electrical components can experience severe damage and failure. Electrical flashover can occur along the surface of an insulator. Flashover can cause local carbonization of the surface (which is conductive) and can lead to a runaway state, causing a short circuit. Overvoltages can cause voltages of a circuit or part of a circuit in an accelerator system to move above the design limit or breakdown voltage, causing potentially hazardous and destructive conditions. Overvoltages can take the form of voltage spikes or power surges.

SUMMARY

According to one aspect of the present disclosure, an over-voltage protection system for an accelerator can include: a plurality of DC power supplies configured to provide a plurality of voltage levels up to a desired voltage level; and an acceleration tube electrically connected to the plurality of DC power supplies and configured to accelerate a charged particle. The acceleration tube can include a plurality of stages. Each stage can include a plurality of electrodes and a plurality of varistors configured to discharge energy in response to an overvoltage event. One electrode of the plurality of electrodes can be electrically coupled to a voltage level of the plurality of voltage levels. The plurality of electrodes and the plurality of varistors can be electrically coupled to each other and arranged in an alternating fashion.

In some embodiments, each stage can include a plurality of insulators, each insulator being arranged in parallel with a varistor. In some embodiments, each stage can include a plurality of water resistors, each water resistor being arranged in parallel with a varistor and an insulator. In some embodiments, each varistor can be connected between an output of a power supply and a relative ground of the power supply. In some embodiments, each varistor can be a metal oxide varistor. In some embodiments, each varistor can include a varistor assembly. The varistor assembly can include a linear stack of varistor elements. In some embodiments, each varistor element can be disk-shaped.

In some embodiments, each DC power supply of the plurality of DC power supplies can be connected in parallel with a varistor. In some embodiments, each DC power supply of the plurality of DC power supplies can include a Cockcroft-Walton multiplier. In some embodiments, each DC power supply of the plurality of DC power supplies can be connected in series. In some embodiments, each varistor can include a threshold voltage. Each varistor can be configured to, in response to a voltage across the varistor surpassing the threshold voltage, limit current from reaching a power supply. In some embodiments, limiting current from reaching the power supply can include discharging energy stored in at least one capacitor within the plurality of power supplies.

According to another aspect of the present disclosure, a protection system for an accelerator can include: a plurality of DC power supplies configured to provide a plurality of voltage levels up to a desired voltage level; a plurality of varistors; and an acceleration tube electrically connected to the plurality of power supplies and configured to accelerate a charged particle. Each varistor of the plurality of varistors can be connected in parallel with a DC power supply. The acceleration tube can include a plurality of stages. Each stage can include a plurality of electrodes; a plurality of insulators; and a plurality of water resistors configured to discharge energy in response to an overvoltage event and grade voltage across the plurality of insulators. One electrode of the plurality of electrodes can be electrically coupled to a voltage level of the plurality of voltage levels. The plurality of insulators and the plurality of water resistors can be electrically in parallel.

In some embodiments, each varistor can include a varistor assembly. The varistor assembly can include a linear stack of varistor elements. In some embodiments, each DC power supply can include a Cockcroft-Walton multiplier. In some embodiments, each varistor can include a threshold voltage. Each varistor can be configured to, in response to a voltage across the varistor surpassing the threshold voltage, discharge energy stored in at least one capacitor within the plurality of power supplies.

According to another aspect of the present disclosure, a method for protecting components of an accelerator can include: providing, via a plurality of DC power supplies, a plurality of voltage levels up to a desired voltage level; accelerating, via an acceleration tube electrically connected to the plurality of DC power supplies, one or more charged particles; and discharging, via the plurality of varistors, energy stored in at least one capacitor within the plurality of DC power supplies. The acceleration tube can include a plurality of stages. Each stage can include a plurality of electrodes and a plurality of varistors configured to discharge energy in response to an overvoltage event. One electrode of the plurality of electrodes can be electrically coupled to a voltage level of the plurality of voltage levels. The plurality of electrodes and the plurality of varistors can be electrically coupled to each other and arranged in an alternating fashion.

In some embodiments, discharging energy stored in at least one capacitor within the plurality of DC power supplies can occur in response to an overvoltage event. In some embodiments, each stage can include a plurality of insulators. Each insulator can be arranged in parallel with a varistor. In some embodiments, each varistor can include a varistor assembly. The varistor assembly can include a linear stack of varistor elements.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

Figure 1:
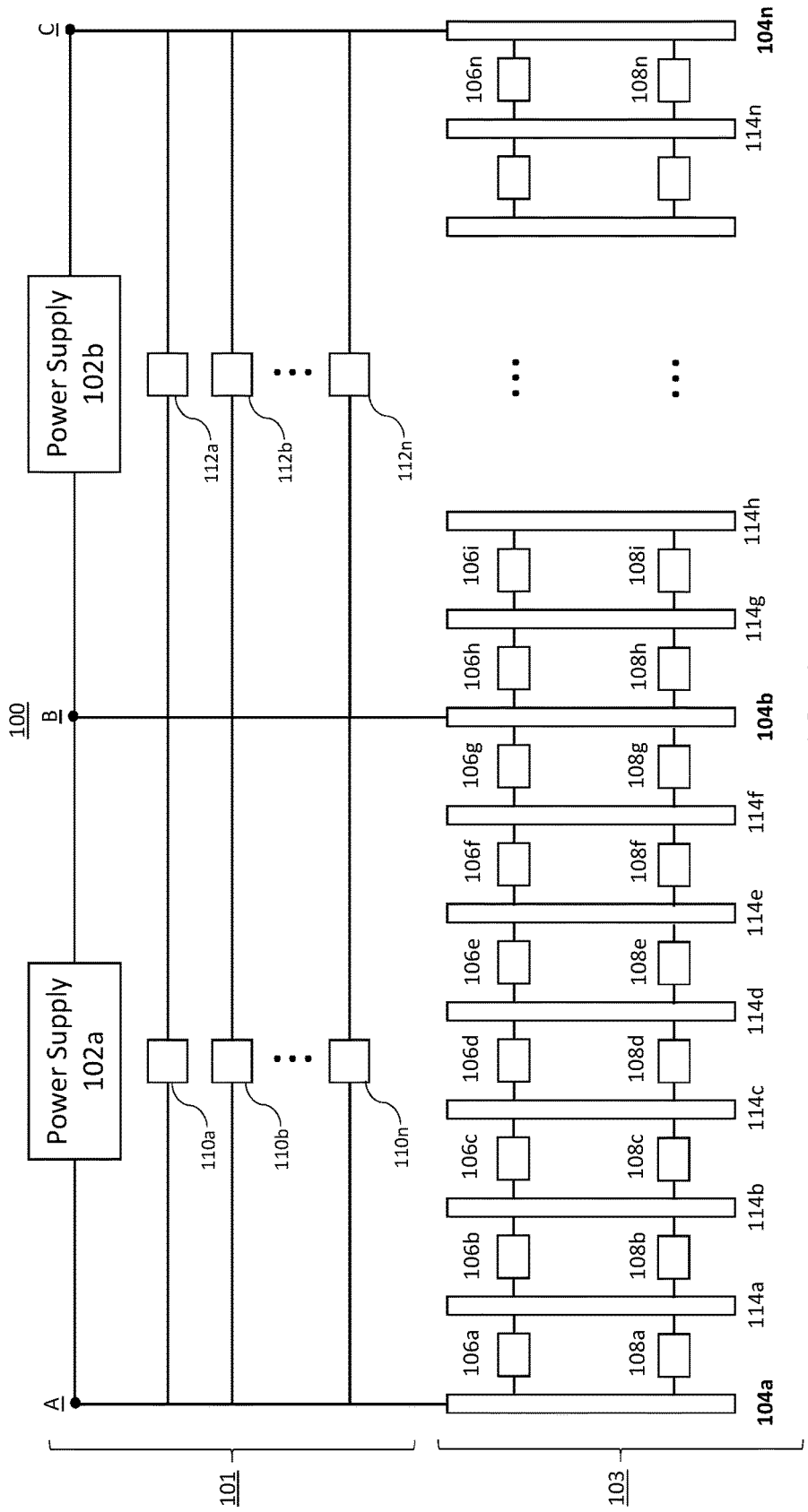
FIG. 1 is a system for protecting high-voltage power supplies in an accelerator, according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

The following detailed description is merely exemplary in nature and is not intended to limit the invention or the applications of its use.

Embodiments of the present disclosure relate to a system for protecting insulators and high-voltage power supplies in a particle accelerator from electrical breakdown and/or electrical flashover that can occur during overvoltage events. The accelerator may be an electrostatic accelerator and may be single-ended or tandem. In some embodiments, the accelerator can include a plurality of high-voltage power supplies connected in series, where each high-voltage power supply can feed the subsequent power supply. In some embodiments, an accelerator assembly can include a linear chain of varistors (e.g. metal oxide varistors or MOVs) between each insulating member of the acceleration tube. The linear chain of varistors can provide substantial protection from overvoltage events to each insulating member and the power supplies.

Accelerator systems have insulators that should be protected from overvoltage breakdown and/or flashover events. Typically, insulators in various other applications are protected using spark gaps. A spark gap can be a gap between two conducting electrodes filled with a gas (e.g. air, sulfur hexafluoride); the gap may allow an electrical spark to pass between the conductors. When the voltage between the conductors exceeds the breakdown voltage (e.g. because of a voltage surge or overvoltage event), a spark forms, ionizing the gas in the gap, dissipating energy, and reducing the resistance, which protects sensitive components. While spark gaps are widely used and cheap, they can have significant shortcomings, especially in relation to accelerators. A $SF_6$ (sulfur hexafluoride) spark gap can have extensive influential design variables such as gas purity, gas pressure, gap distance, geometry, etc. The large number of variables to potentially consider and control while designing an accelerator system with a spark gap protection system can make it difficult to control the timing and voltage set points of each spark gap. In addition, spark gaps can be susceptible to time lags. As the rise time of an event becomes faster and the voltage at which a spark gap fires increases, the time before the spark gap fires can also increase, which can fail to protect insulators.

In addition, certain types of accelerators can have additional components (other than insulators) that are sensitive and susceptible to overvoltage events. For example, electrostatic accelerators utilize high-voltage power supply components that can be severely damaged by overvoltage events. Contrary to the alternating and dynamic potentials used in linear accelerators (linacs), magnetic induction accelerators, and cyclotrons, electrostatic accelerators use DC voltages to accelerate particles. However, generating DC voltages within the accelerator high enough to accelerate a particle up to necessary energy levels typically involves complex circuitry and sensitive components (e.g. diodes and capacitors) to step up the voltage. An example of this is a Cockcroft-Walton circuit or multiplier. In some embodiments, a Cockcroft-Walton multiplier may include a chain or ladder of high-voltage diodes to step up a voltage level. The components in the high-voltage power supply can also be susceptible to overvoltage events and electrical breakdown. Many attempts at protecting sensitive components, such as insulating materials, in accelerator assemblies fail to protect the high-voltage power supply; these attempts also typically only include a single, large high-voltage power supply. So, in addition to failing to protect a single high-voltage power supply, these attempts would be even more deficient at offering protection for a plurality of high-voltage power supplies in the same system.

Metal oxide varistors (MOVs) can serve as overvoltage protection devices in electrostatic accelerators. MOVs have resistance that can vary with voltage, thus protecting other components from receiving excessive currents. MOVs can have a forward region that is has a high resistance and conducts very little current when the voltage is low. However, as the voltage increases past the varistor voltage, the resistance of the MOV can decrease a significantly and vastly increase the current flowing through the MOV. The intrinsic response time of MOV materials can be on the order of five hundred picoseconds, and MOV devices can operate on a 1-10 nanosecond scale. The use of MOVs can also provide an accurate voltage threshold where the overvoltage will activate the accelerator assembly and protect the insulators from environmental changes. The resistive characteristics of MOVs and the speed at which MOVs can discharge stored energy within the system during overvoltage conditions can assist with dampening the discharge of the stored energy, protecting both the insulators and high-voltage power supplies within an accelerator assembly. Connecting MOVs in series between the output of the power supply and its relative ground can short out the power supply when the MOV's conduct. The shorting can thus discharge the energy stored in the capacitors within the power supplies. Although not all the stored energy within the system is in the power supply capacitors, the capacitance of the entire structural system can be discharged through the MOV chain.

FIG. 1 is a system 100 for protecting high-voltage power supplies in an accelerator, according to some embodiments of the present disclosure. System 100 can also protect insulators. System 100 can include an accelerator support structure 101 (sometimes referred to as the column) and an acceleration tube 103. Accelerator support structure 101 can include power supplies 102a-b (herein referred to as power supplies 102 generally), a first plurality of structure insulators 110a-n (structure insulator 110 generally), and a second plurality of structure insulators 112a-n (structure insulators 112 generally).

Accelerator support structure 101 can offer structural support and various stages of voltage levels to acceleration tube 103. During operation, acceleration tube 103 can be used to accelerate charged particles or charged particle beams up to a desired energy level. Acceleration tube 103 can also be referred to as a vacuum tube. Each power supply unit 102 can include a desired amount of power to the assembly. For example, each power supply 102 can provide 10 kW to the assembly, or 200 kV and 50 mA. Each power supply 102 can include various sensing circuits to control the power supply. The sensing circuitry can also be susceptible to damage from overvoltage events and can thus be protected by the MOV arrangements of the present disclosure. Note, system 100 is not limited to two power supplies 102a and 102b and thus two voltage levels. In some embodiments, accelerator support structure 101 can include fifteen or more power supplies or stages to create fifteen or more voltage levels. In some embodiments, each power supply may be evenly spaced along the accelerator structure 101. In some embodiments, power supplies 102 may include Cockcroft-Walton multipliers. A certain voltage level may be provided from a standard voltage source, and each stage of the power supply circuit (e.g. power supply 102a, power supply 102b, etc.) can step up the voltage by a certain, pre-defined amount. For example, assuming an input voltage of 100 kV, each power supply may subsequently step up the voltage by 100 kV. The constant increase in voltage levels, as further described below, can yield an electric field within the acceleration tube 103, which can then be used to accelerate particles. The voltage level of each power supply 102 may be determined based on the desired final energy level of the particle.

In some embodiments, acceleration tube 103 may include a plurality of voltage-setting electrodes 104a-n (voltage-setting electrodes 104 generally), a plurality of MOVs 106a-n (MOV 106 generally), a plurality of electrical insulators 108a-n (insulator 108 generally), and a plurality of secondary electrodes 114a-n (secondary electrodes 114 generally). In some embodiments, the secondary electrodes 114 can transport, shape, and control the trajectory of protons (or other charged particles) traveling within the acceleration tube 103. The secondary electrodes 114 can also grade the electric field to help provide a linear acceleration. In some embodiments, the placement of MOVs 106 may protect both power supplies 102, structure insulators 110 and 112, and insulators 108 from experiencing electrical breakdown and/or flashover during overvoltage events. For example, as described earlier, when the voltage across a varistor (e.g. MOV or any other type of varistor) increases, the resistance of the material decreases. With varistors, there is a threshold voltage at which the varistor can switch from being highly resistive to highly conductive (i.e. the varistor switches from operating with low currents to very high currents), Thus, in response to overvoltage events and large surges of high voltage, the resistance of each MOV can decrease, increasing the current that flows through it. The benefit of this can come from the parallel arrangement of an MOV and an insulator. Because the total current through parallel components (e.g. the sum of the currents through two parallel components) will remain consistent and the varistors are configured to intake large amounts of current (e.g. in response to an overvoltage event), this can prevent excessive current from flowing through the insulators. Excessive current through an insulator can cause severe damage and failure, especially at the operation levels of a particle accelerator. The response time of MOV's allows them to quickly and efficiently prevent current from destroying these components.

In some embodiments, each voltage-setting electrode 104 may be electrically connected to a power supply 102 and operate at the voltage level of said power supply 102. For example, the voltage at point A may be 100 kV; in turn, the voltage at voltage-setting electrode 104a would also be 100 kV. Power supply 102a may step up the voltage from 100 kV to 200 kV, thus setting the voltage at point B and voltage-setting electrode 104b to 200 kV. Similarly, power supply 102b may step up the voltage from 200 kV to 300 kV, thus setting the voltage at point C and voltage-setting electrode 104n to 300 kV. Although the acceleration tube is not explicitly and/or pictorially shown in FIG. 1, the voltage-setting electrodes 104 thus create uniform or near-uniform voltage differences along the inner region of the tube, inducing a uniform or near-uniform electric field in the horizontal direction of the acceleration tube. The resultant electric field can be used to accelerate particles.

A power supply and an associated voltage-setting electrode may herein be referred to as a stage. A stage may further include the MOVs and secondary electrodes between the associated voltage-setting electrode and the voltage-setting electrode of the previous stage. For example, power supply 102a and voltage-setting electrode 104b may form a first stage and power supply 102b and voltage-setting electrode 104n may form a second stage. The first stage may include MOVs 106a-106g, secondary electrodes 114a-f, and insulators 108a-g. The second stage may include MOVs 106h-n, secondary electrodes 114g-n, and insulators 108h-n. In some embodiments, secondary electrodes 114 and MOVs 106 may be connected in alternating fashion. Note, FIG. 1 is merely exemplary nature and an accelerator system is not restricted to two stages. In some embodiments, an accelerator may include up to fifteen or more stages. Each stage may include alternating MOVs and secondary electrodes. In some embodiments, each stage may also include an insulator in parallel with each MOV. In some embodiments, an MOV 106 may be an MOV assembly, such as assembly 400 of FIGS. 4A and 4B. In other words, MOV 106 may include one or more individual MOVs. In embodiments where each MOV 106 includes multiple MOVs, the MOVs may be arranged in series or in a linear chain.

Figure 2:
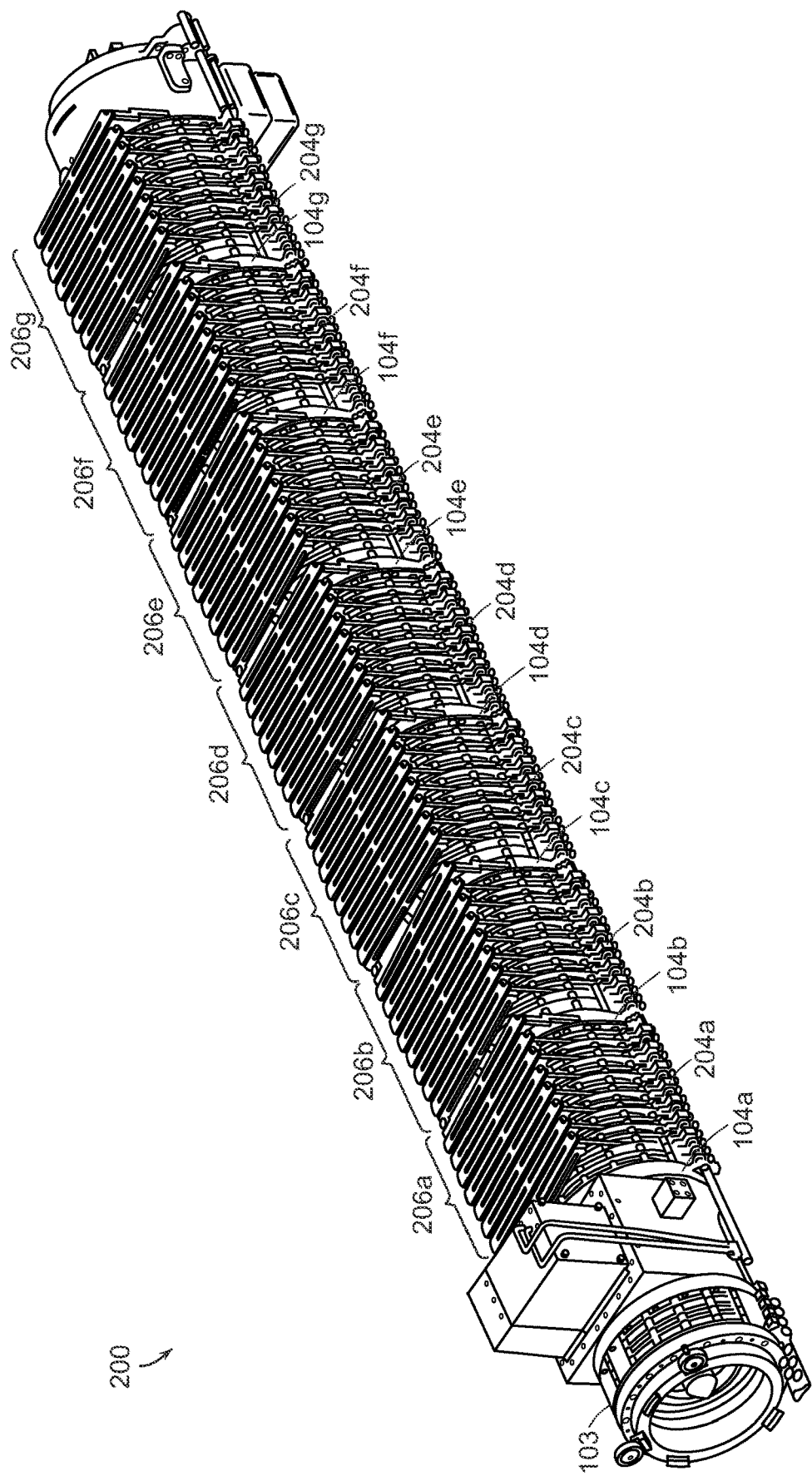
FIG. 2 is a perspective view of an acceleration tube with an overvoltage protection system, according to some embodiments of the present disclosure.

FIG. 2 is a perspective view of an acceleration tube with an overvoltage protection system 200, according to some embodiments of the present disclosure. System 200 may include acceleration tube 103 and stages 206a-g (stage 206 generally). Note, the accelerator structure 101 of FIG. 1 is not shown in this figure. Each stage 206 can include a voltage-setting electrode 104 and a plurality of alternating MOVs and secondary electrodes 204 (e.g. secondary electrodes 114 and MOVs 106 of FIG. 1). In some embodiments, each stage may also include insulators, such as insulators 108 of FIG. 1, in parallel with the MOVs. For example, stage 206a can include voltage-setting electrode 104a and a plurality of alternating MOVs and secondary electrodes 204a. Each voltage-setting electrode 104 can be configured to be electrically coupled to a separate high-voltage power supply (e.g. separate Cockcroft-Walton multiplier and power source) and thus be set at a certain voltage level, as described in relation to FIG. 1. Each voltage-setting electrode 104 can be configured to set a voltage level within the acceleration tube 103, thus generating a uniform or near-uniform electrical field within acceleration tube 103. Particles can then be accelerated within acceleration tube 103.

Figure 3:
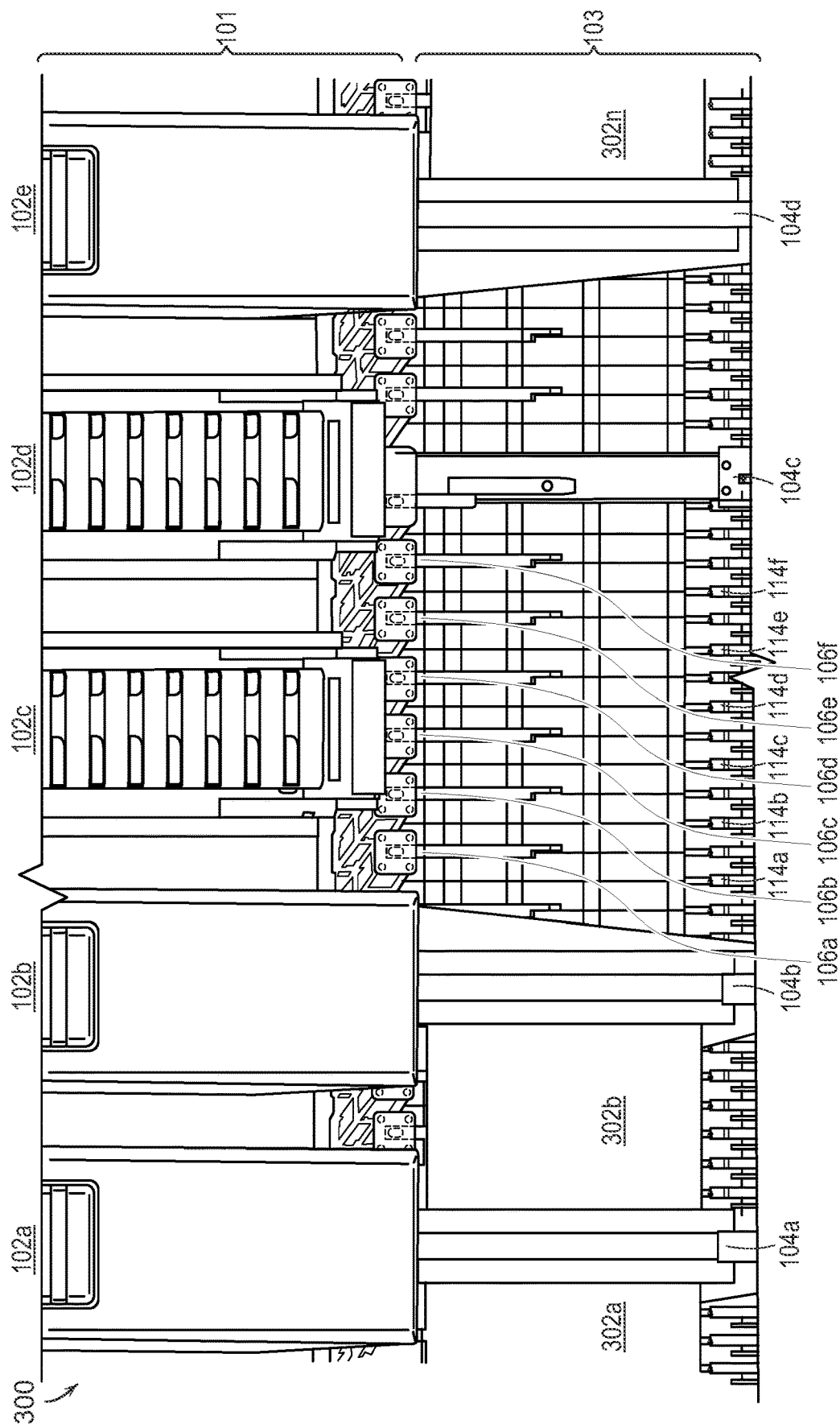
FIG. 3 is a side view of an accelerator with an overvoltage protection system, according to some embodiments of the present disclosure.

FIG. 3 is a side view of an accelerator with an overvoltage protection system 300, according to some embodiments of the present disclosure. System 300 can include an accelerator structure 101, an acceleration tube 103, and a plurality of electrical insulators 302a-n (e.g. insulators 110a-n in FIG. 1). In some embodiments, accelerator structure 101 can include a plurality of high-voltage power supplies 102a-e, similar to or the same as described in FIG. 1. Acceleration tube 103 may be configured to accelerate particles via a DC electric field. Voltage-setting electrodes 104a-d may be electrically coupled to power supplies 102 to be set at the associated voltage and thus setting various voltage levels within the acceleration tube 103. Stages may be defined as described in relation to FIGS. 1 and 2. For example, power supply 102b and voltage-setting electrode 104b may form a stage; this stage may also include MOVs 106a-c and at least secondary electrodes 114a-c. A stage may also include an electrical insulator. For example, the stage that includes power supply 102a and voltage-setting electrode 104a can also include electrical insulator 302b. Electrical insulators 302 may physically cover the secondary electrodes 114.

Figure 4A:
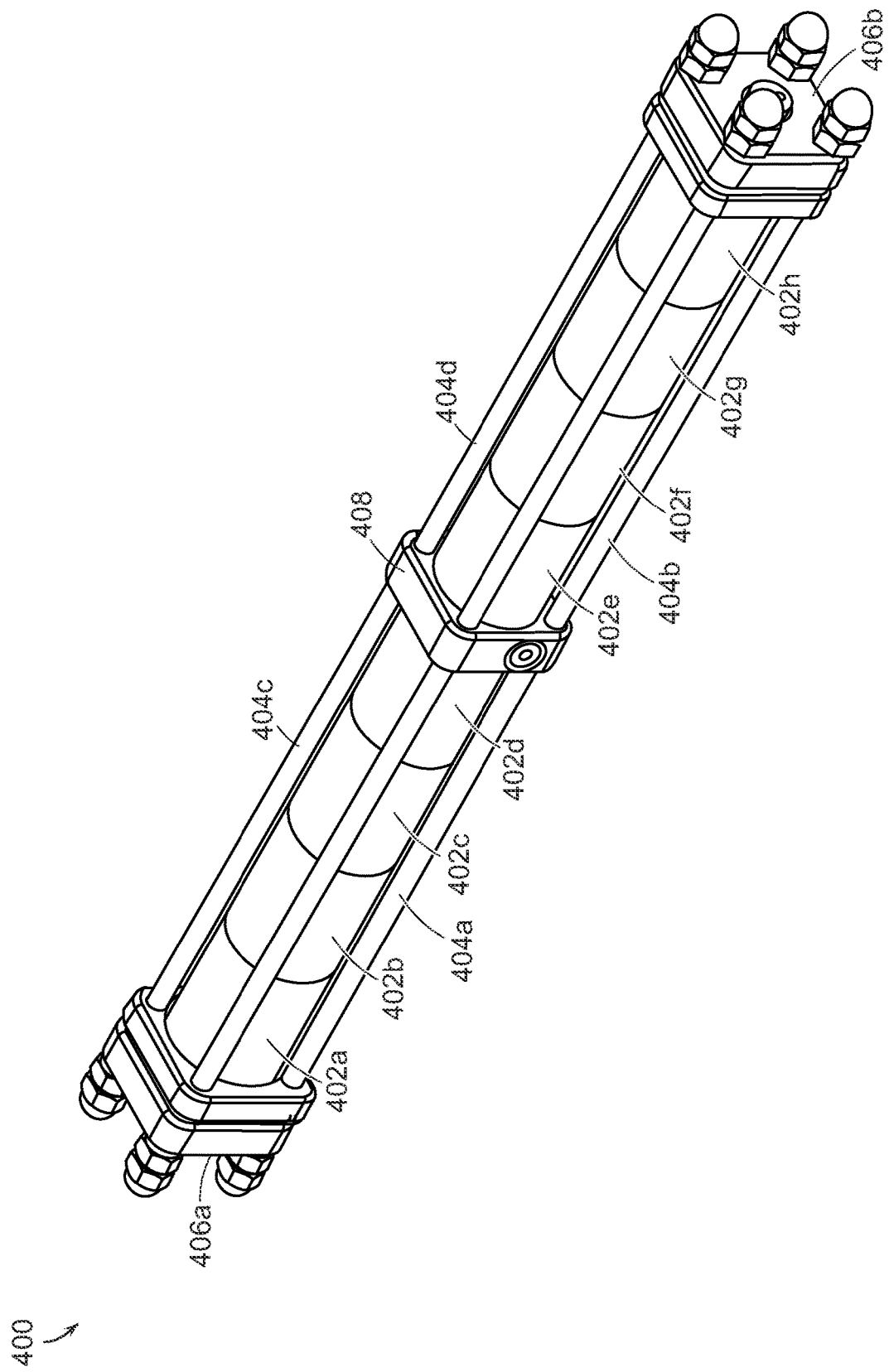
FIG. 4A is a perspective view of an MOV assembly, according to some embodiments of the present disclosure.
Figure 4B:
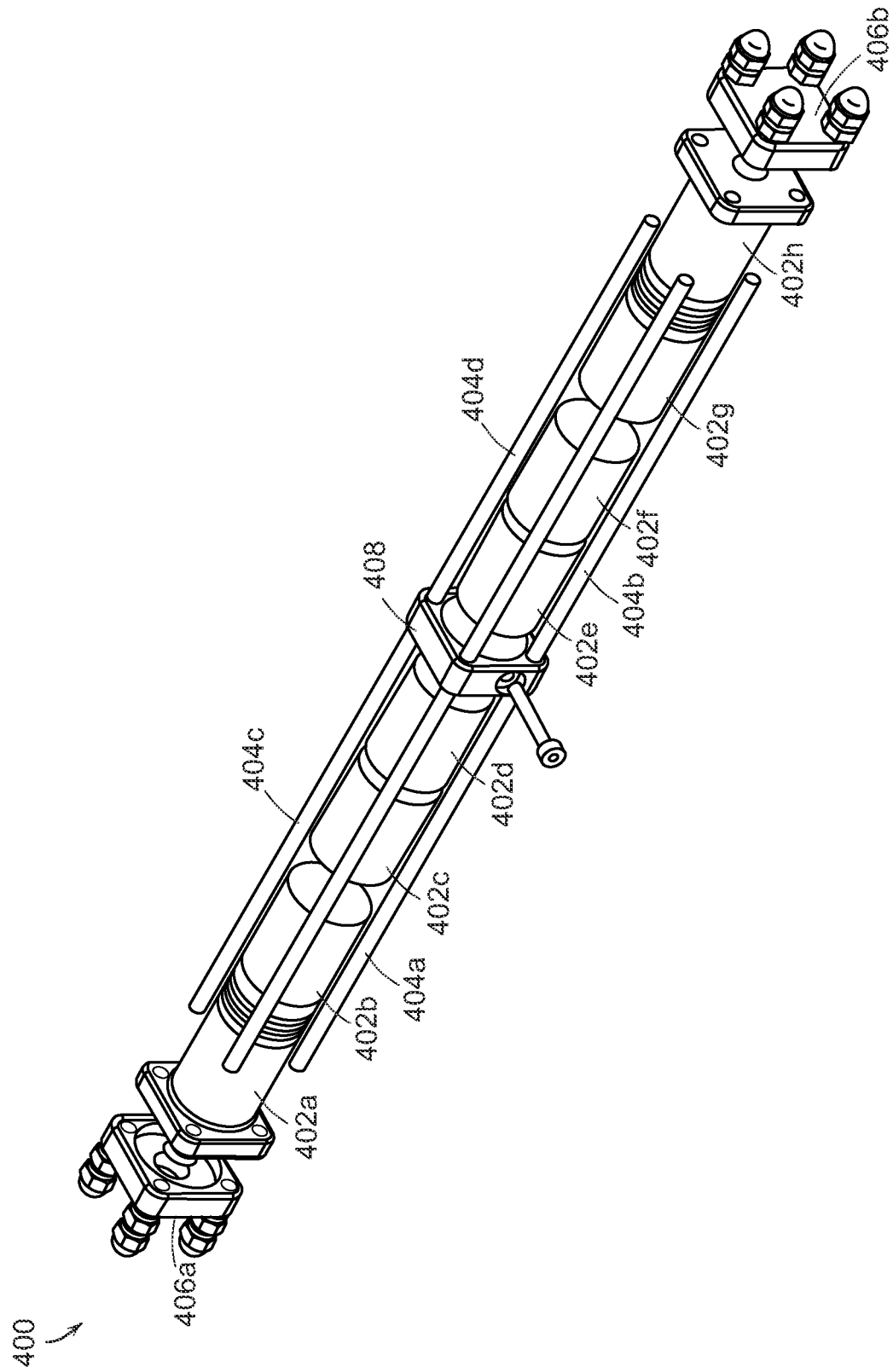
FIG. 4B is an exploded view of an MOV assembly, according to some embodiments of the present disclosure.

FIG. 4A is a perspective view of an MOV assembly 400, according to some embodiments of the present disclosure. FIG. 4B is an exploded view of an MOV assembly, according to some embodiments of the present disclosure. In some embodiments, MOV assembly 400 may be used as MOVs 106 in any of FIGS. 1-3. MOV assembly 400 may include MOV disks 402a-h, tie rods 404a-d, end mounts 406a-b, and a middle mount 408. In some embodiments, MOV disks 402a-h may be arranged in a "stack." A stack arrangement can ensure a good electrical connection during conduction. Because each varistor disk in a stack may be "forced" into one other, the increased mechanical pressure can help to increase the electrical connection. In some embodiments, MOV disks may be arranged in other geometric fashions. In some embodiments, each MOV (e.g. MOV 402) may be a shape other than disk; for example, each MOV may be a cube, prism, or any other cross-sectional shape. Middle mount 408 and end mounts 406a-b may be configured to receive tie rods 404, structurally securing the MOV assembly to an acceleration tube, such as acceleration tube 103. Middle mount 408 and end mounts 406a-b may also be configured to receive and hold in place the MOV disks 402.

MOV disks 402 may include any metal oxide materials. In some embodiments, the voltage trigger point for the varistor assembly may be 24 kV per electrode/insulator. An example MOV disk can be a BHD1375-AL by Dean Technologies. This varistor, as an example, can provide a total rated voltage of 24 kV $V_{rms}$ per insulator. In some embodiments, an individual MOV disk may include electrical characteristics/ratings such as 6 kV and 55 kA. In some embodiments, an MOV disk can have a diameter of 32 and a length of 42. In some embodiments, MOV assembly 400 may include fewer than or more than eight MOV disks, depending on the desired level of protection of each component. In some embodiments, MOV disks 402 may be arranged in series. The total resistance of components in series is the sum of the resistance of each component. With regard to FIGS. 4A and 4B, the total resistance of the MOV assembly 400 can thus be the sum of the resistance of each of MOVs 402a-h.

In some embodiments, an MOV assembly 400 can span three electrodes. The center of the assembly 400 can have a built-in clamp that attaches to an electrode. The assembly can be positioned at a slight angle, so that each end of the MOV assembly 400 can be attached to an adjacent electrode with an aluminum bar with a clamp to the electrode. An MOV assembly 400 can protect two insulators in series.

Figure 5:
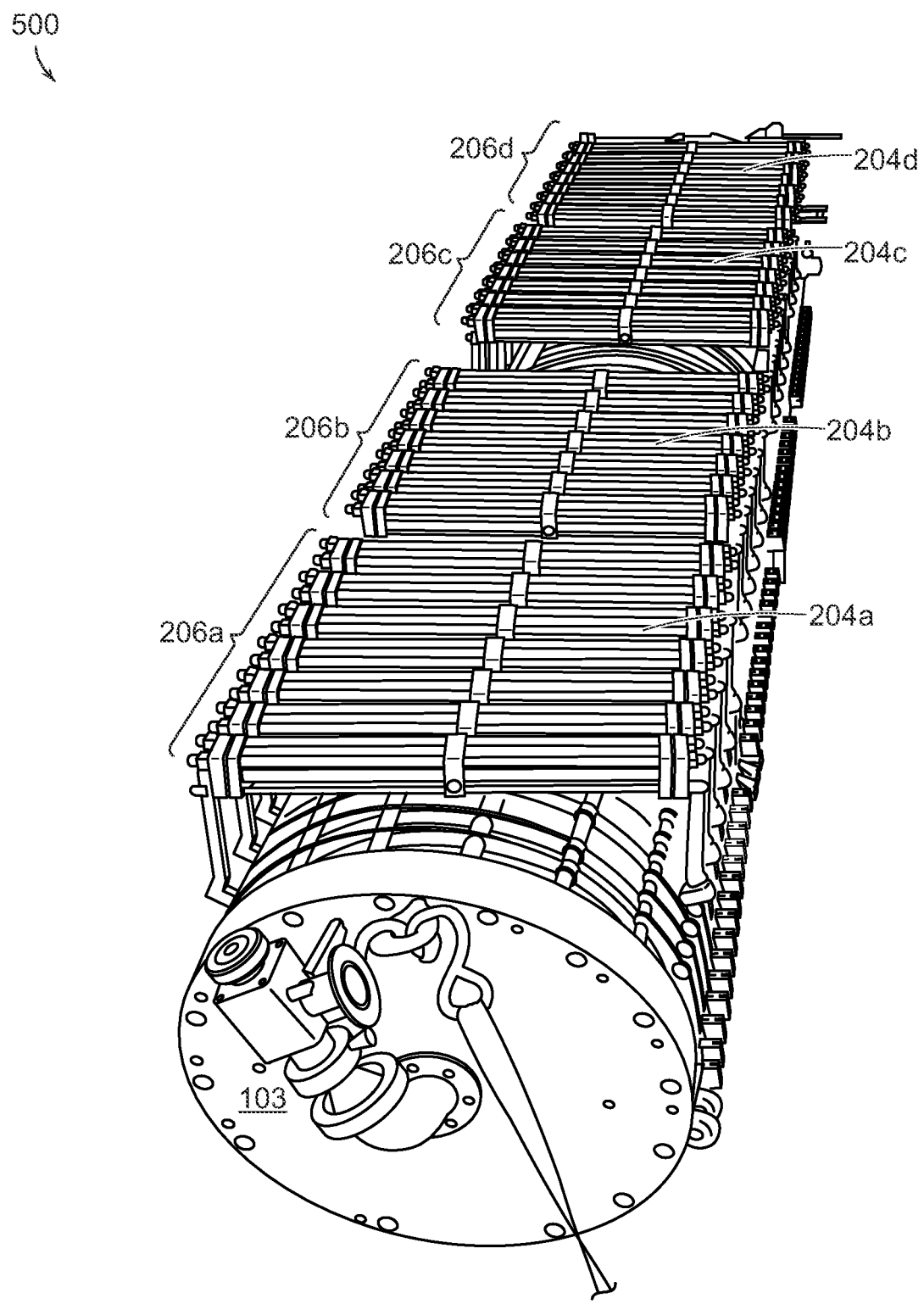
FIG. 5 is a front perspective view of an acceleration tube with an overvoltage protection system, according to some embodiments of the present disclosure.

FIG. 5 is a front perspective view of an acceleration tube with an overvoltage protection system 500, according to some embodiments of the present disclosure. System 500 can include an acceleration tube 103 and a plurality of stages 206a-d similar to or the same as the stages 206 as described in relation to FIG. 2. In some embodiments, each stage 206 may include a plurality of alternating MOVs and secondary electrodes 204 (e.g. secondary electrodes 114 and MOVs 106 of FIG. 1). Although not visible, each MOV can be arranged in parallel with an insulating material to protect the insulating material. In the event of an overvoltage event, one or more MOVs may respond to the voltage surge by decreasing their resistance and increasing the amount of current flowing through the MOV. In essence, one or more MOVs may begin to operate as an electrical short and can prevent the protected component (e.g. an insulating material or the high-voltage power supplies) from receiving excessive amounts of current and being damaged.

Figure 6:
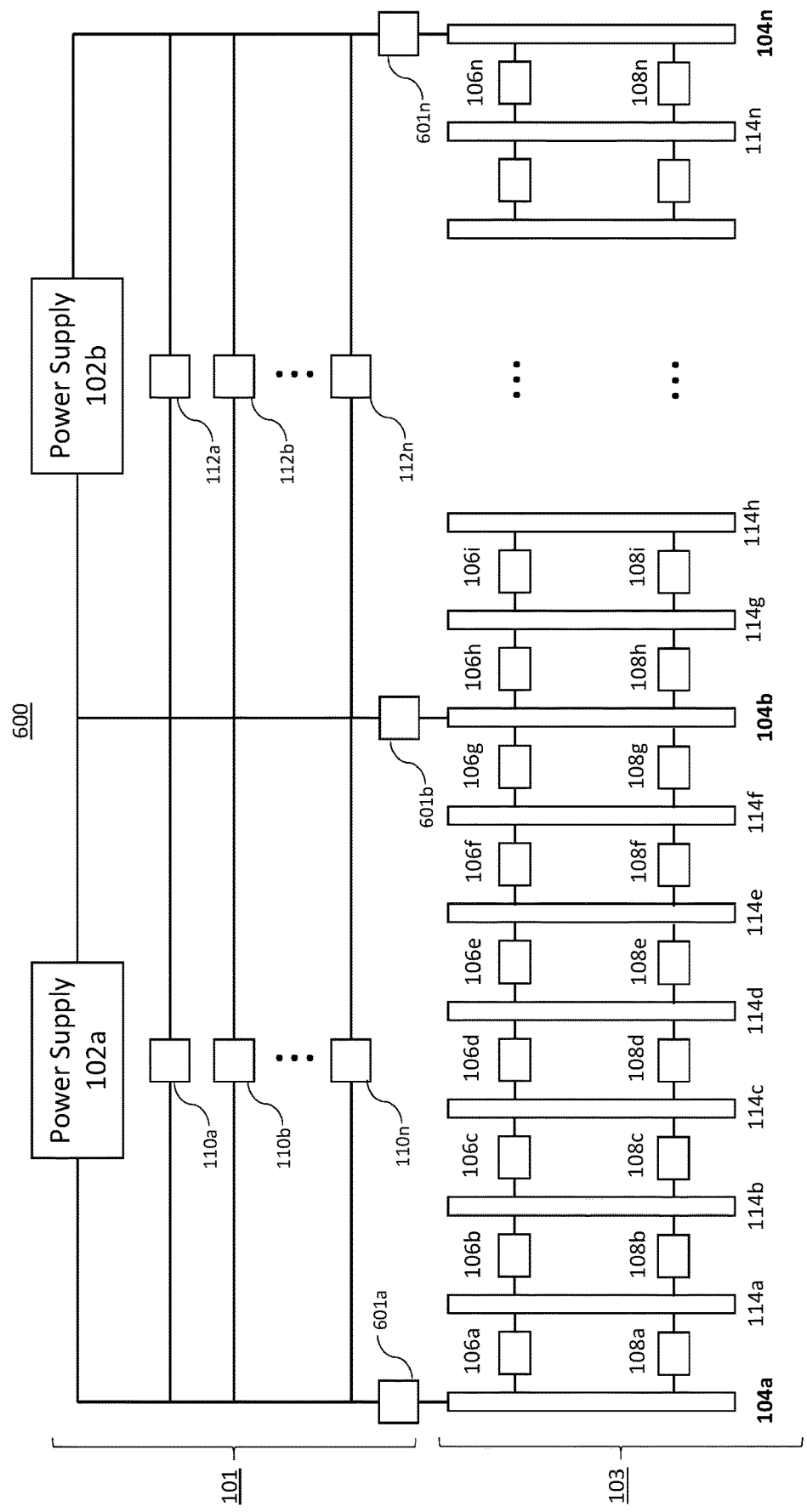
FIG. 6 is another system for protecting high-voltage power supplies in an accelerator, according to some embodiments of the present disclosure.

FIG. 6 is another system 600 for protecting a high-voltage power supply in an accelerator, according to some embodiments of the present disclosure. Similar to system 100, system 600 can include an accelerator support structure 101 and an acceleration tube 103. Accelerator support structure 101 can include power supplies 102, a first plurality of structure insulators 110, and a second plurality of structure insulators 112.

Similar to system 100 of FIG. 1, accelerator support structure 101 can offer structural support and various stages of voltage levels to acceleration tube 103. During operation, acceleration tube 103 can be used to accelerate charged particles up to a desired energy level. Power supplies 102 can include circuitry to step up and produce various levels of DC voltages, up to a certain desired level. Note, system 600 is also not limited to two power supplies 102a and 102b and thus two voltage levels. In some embodiments, accelerator support structure 101 can include fifteen or more power supplies or stages to create fifteen or more voltage levels. In some embodiments, each power supply may be evenly spaced along the accelerator structure 101. In some embodiments, power supplies 102 may include Cockcroft- Walton multipliers. A certain voltage level may be provided from a standard voltage source, and each stage of the power supply circuit (e.g. power supply 102a, power supply 102b, etc.) can step up the voltage by a certain, pre-defined amount. For example, assuming an input voltage of 100 kV, each power supply may subsequently step up the voltage by 100 kV. The constant increase in voltage levels, as further described below, can yield an electric field within the acceleration tube 103, which can then be used to accelerate particles. The voltage level of each power supply 102 may be determined based on the desired final energy level of the particle.

System 600 can include a plurality of power resistors 601a-n (herein referred to as power resistors 601 generally). In some embodiments, each power resistor 601 can be electrically positioned between a voltage-setting electrode 104 and the associated power supply. For example, power resistor 601b can be positioned between voltage-setting electrode 104b and power supply 102a (the power supply that supplies the voltage level to voltage-setting electrode 104b). In some embodiments, during an overvoltage event, each power resistor 601 can hold off the voltage surge between the accelerator structure 101 and the acceleration tube 103. A power resistor is typically designed to withstand and dissipate large amounts of power and can include materials with high thermal conductivities.

Figure 7:
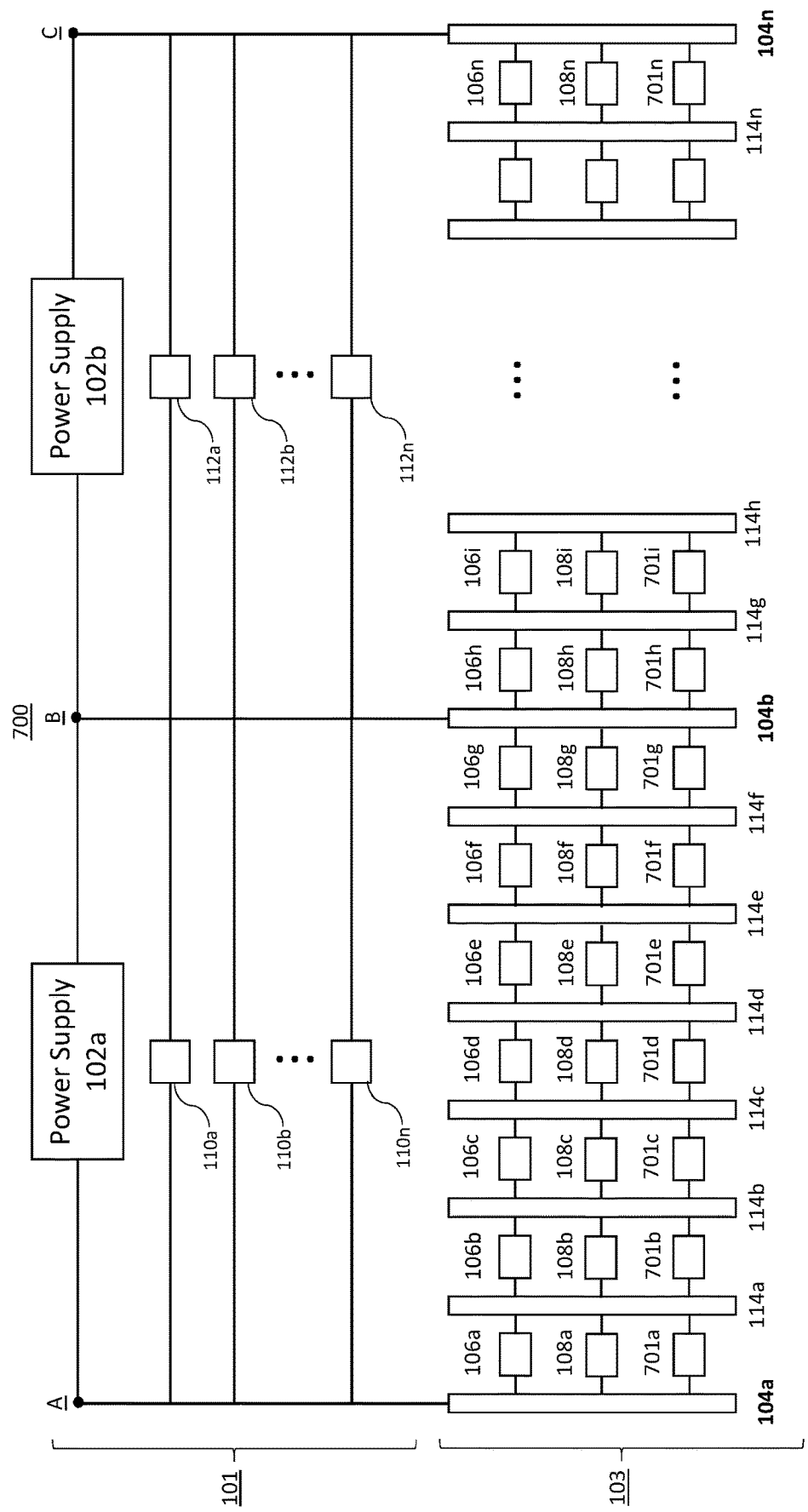
FIG. 7 is another system for protecting high-voltage power supplies in an accelerator, according to some embodiments of the present disclosure.

FIG. 7 is another system 700 for protecting a high-voltage power supply in an accelerator, according to some embodiments of the present disclosure. Similar to system 100, system 700 can include an accelerator support structure 101 and an acceleration tube 103. Accelerator support structure 101 can include power supplies 102, a first plurality of structure insulators 110, and a second plurality of structure insulators 112.

System 700 can include a plurality of MOVs 106a-n and a plurality of electrical insulators 108a-n. As described previously herein, the placement of MOVs 106 may protect both power supplies 102, structure insulators 110 and 112, and insulators 108 from experiencing electrical breakdown and/or flashover during overvoltage events. In some embodiments, system 700 can also include a plurality of water resistors 701a-n (701 generally, as described herein). In some embodiments, each water resistor 701 can operate as a variable resistor (e.g. a varistor) and can have a resistance that varies with voltage. In addition to MOVs 106, water resistors 701 can also help to protect power supplies 102, structure insulators 110 and 112, and insulators 108 from electrical breakdown and/or flashover during overvoltage events. In some embodiments, water resistors 701 can ensure an even grading of the voltage across the insulators 108. In some embodiments, each of the MOVs (e.g. 106a), electrical insulators (e.g. 108a), and water resistors (e.g. 701a) can be connected in parallel between two electrodes (e.g. 104a and 114a). In some embodiments, this can help to ensure even grading and protection along the length of the acceleration tube 103.

Figure 8:
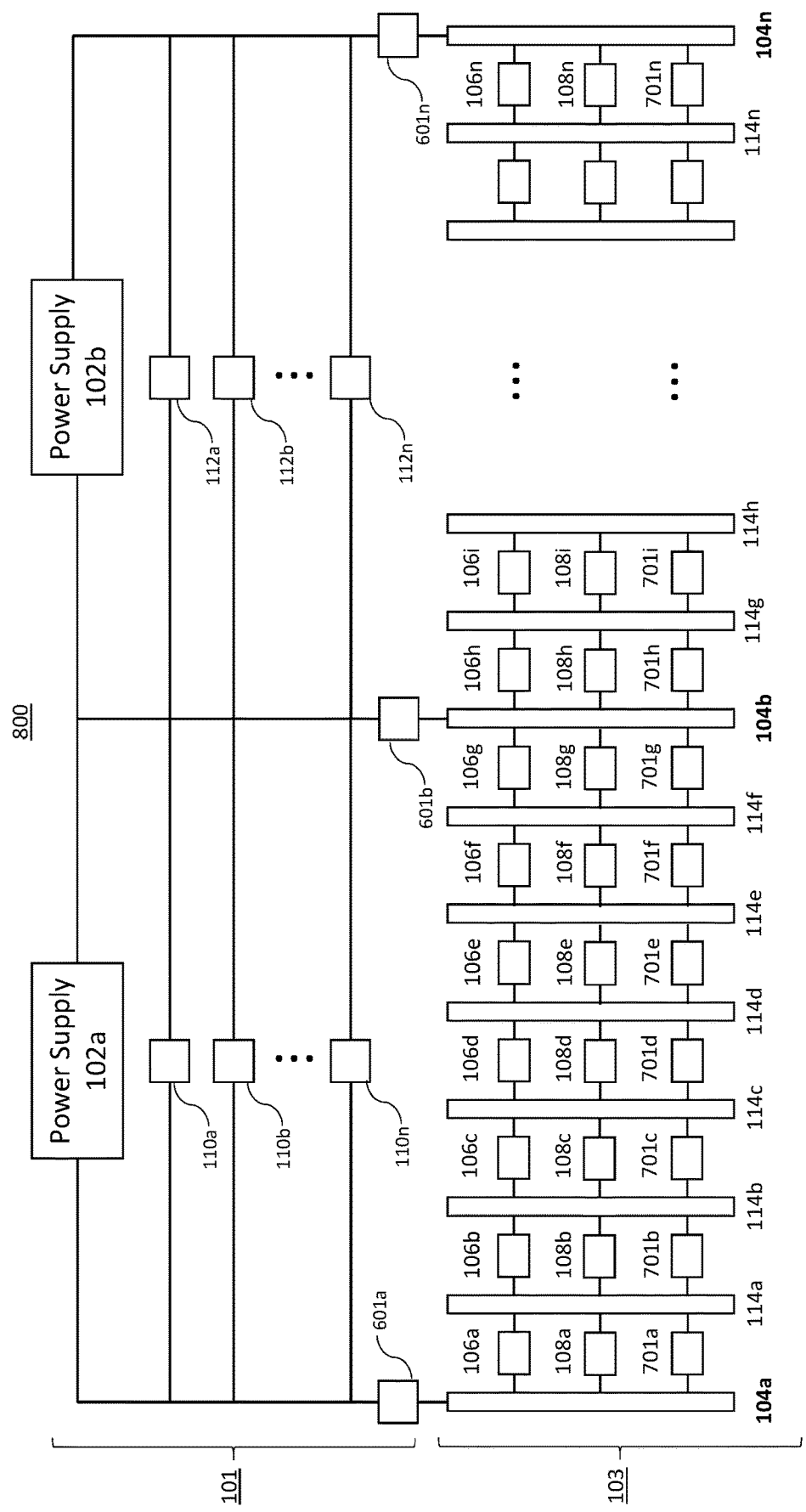
FIG. 8 is another system for protecting high-voltage power supplies in an accelerator, according to some embodiments of the present disclosure.

FIG. 8 is another system 800 for protecting a high-voltage power supply in an accelerator, according to some embodiments of the present disclosure. Similar to system 100, system 800 can include an accelerator support structure 101 and an acceleration tube 103. Accelerator support structure 101 can include power supplies 102, a first plurality of structure insulators 110, and a second plurality of structure insulators 112.

Similar to as described above in relation to FIG. 7, system 800 can include a plurality of MOVs 106a-n, a plurality of electrical insulators 108a-n, and a plurality of water resistors 701a-n. Additionally, system 800 can include a plurality of power resistors 601a-n. As described above in relation to FIG. 6, each power resistor 601 can be electrically positioned between a voltage-setting electrode 104 and the associated power supply. For example, power resistor 601b can be positioned between voltage-setting electrode 104b and power supply 102a (the power supply that supplies the voltage level to voltage-setting electrode 104b). In some embodiments, during an overvoltage event, each power resistor 601 can hold off the voltage surge between the accelerator structure 101 and the acceleration tube 103. A power resistor is typically designed to withstand and dissipate large amounts of power and can include materials with high thermal conductivities.

Figure 9:
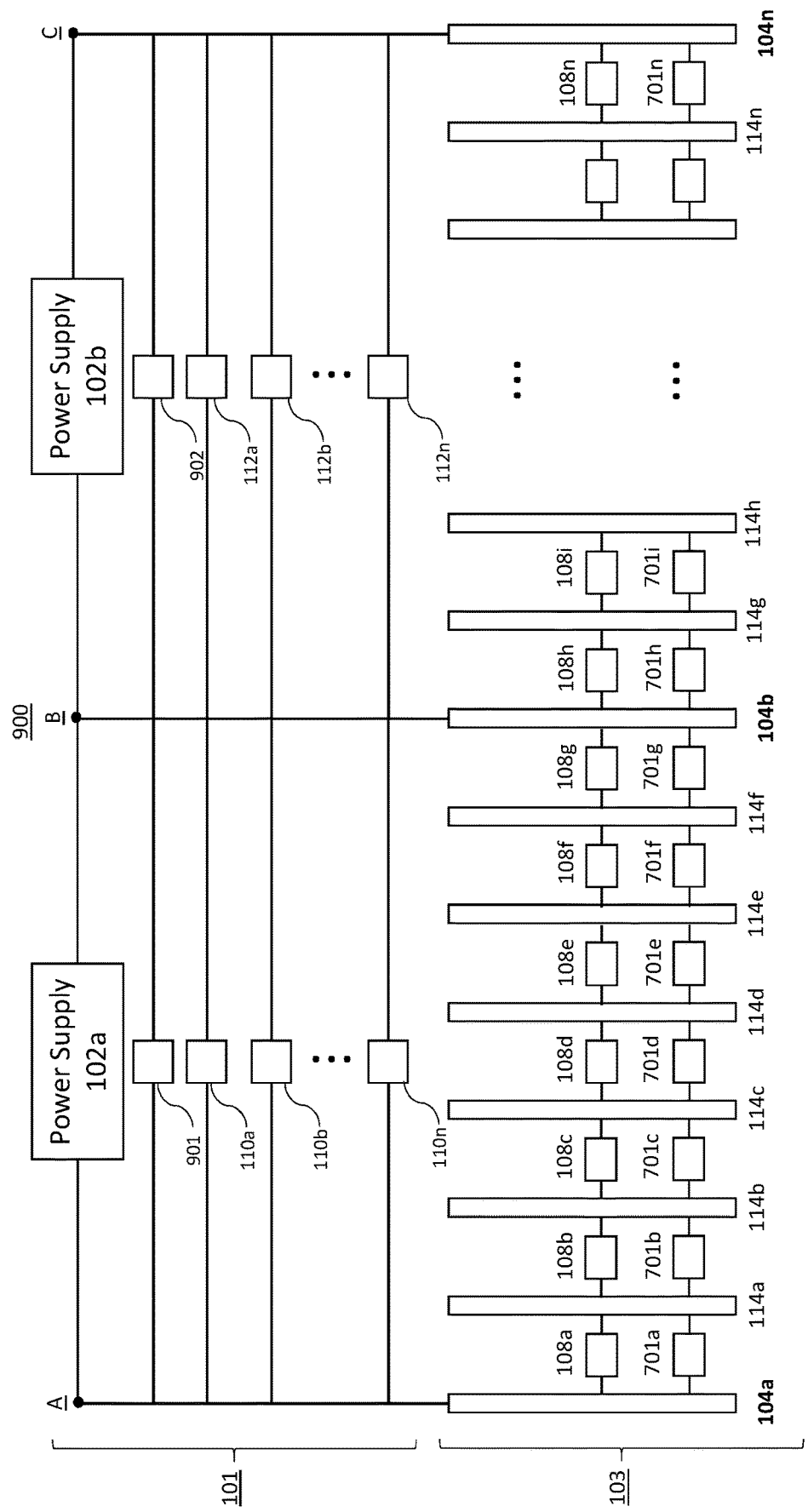
FIG. 9 is another system for protecting high-voltage power supplies in an accelerator, according to some embodiments of the present disclosure.

FIG. 9 is another system 900 for protecting a high-voltage power supply in an accelerator, according to some embodiments of the present disclosure. System 900 can include a plurality of electrical insulators 108a-n and a plurality of water resistors 701a-n. Additionally, system 900 can include a plurality of MOVs 901 and 902. As described in relation to FIGS. 7 and 8, water resistors 701a-n can be connected in series with the insulators 108, between electrodes 114. In some embodiments, the water resistors can offer protection from electrical breakdown and/or flashover during overvoltage events and can grade the voltage across insulators 108. In some embodiments, MOVs 901 and 902 can provide protection for insulators 110 and 112 and power supplies 102a-b. Note, system 900 is not limited to two MOVs 901 and 902 and may include an MOV for each power supply. For example, if an accelerator were to have fifteen power supplies to create fifteen voltage levels within the acceleration tube 103, the system could include fifteen MOVs, each connected in parallel with a power supply and insulators. In some embodiments, the power-supply-side MOVs 901 and 902 can protect the sensitive components contained within each power supply 102.

Figure 10:
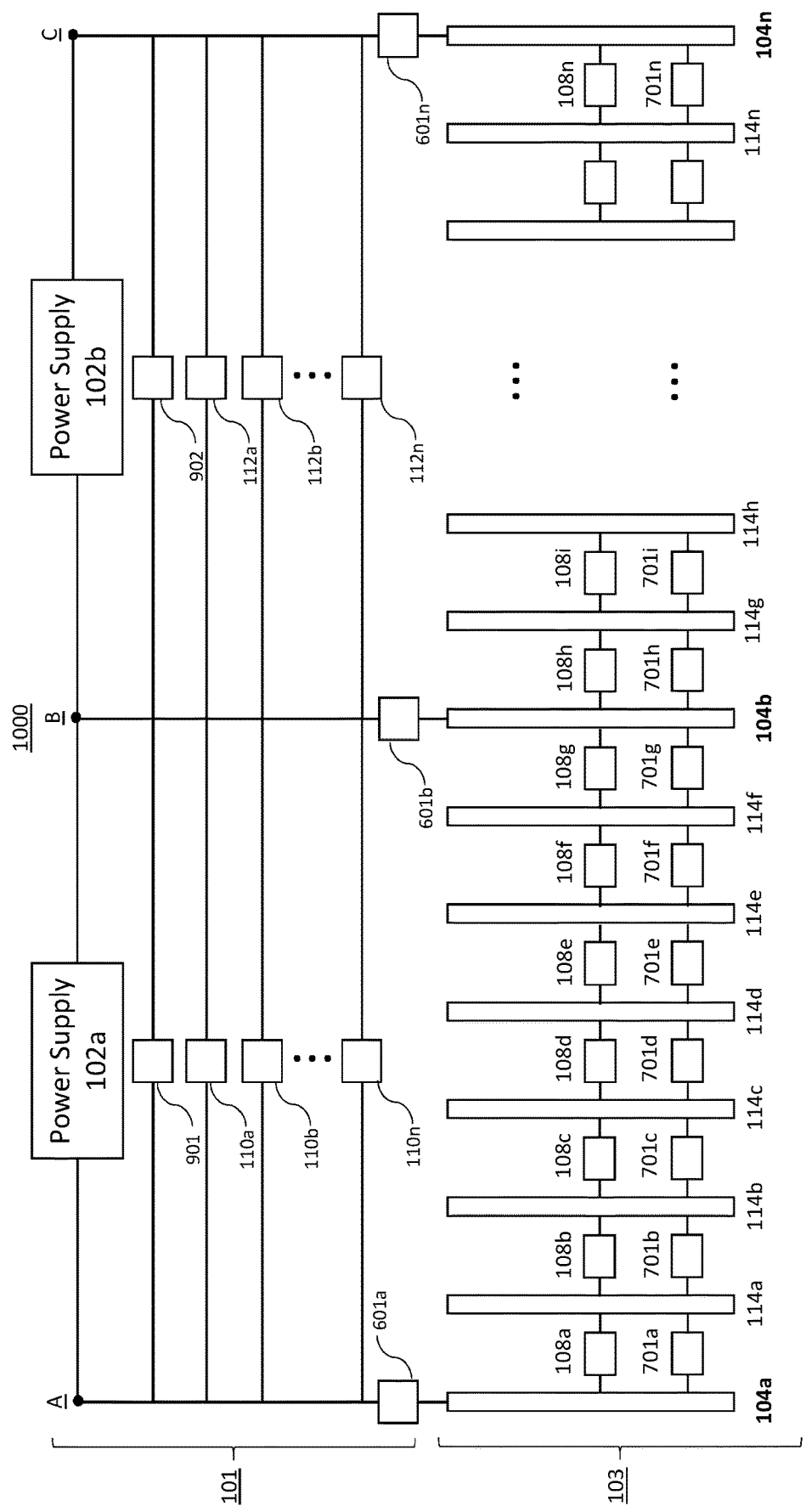
FIG. 10 is another system for protecting high-voltage power supplies in an accelerator, according to some embodiments of the present disclosure.

FIG. 10 is another system 1000 for protecting a high-voltage power supply system in an accelerator, according to some embodiments of the present disclosure. System 1000, similar to FIG. 9 described above, can include a plurality of electrical insulators 108a-n, a plurality of water resistors 701a-n, a plurality of power-supply-side MOVs 901 and 902, and a plurality of power resistors 601a-n, similar to those described in relation to FIG. 6. In some embodiments, the combination of MOVs 901 and 901 and power resistors 601a-n can offer improved protection for power supplies 102, in addition to the protection and voltage grading properties that can be offered by the water resistors 701a-n.

Figure 11:
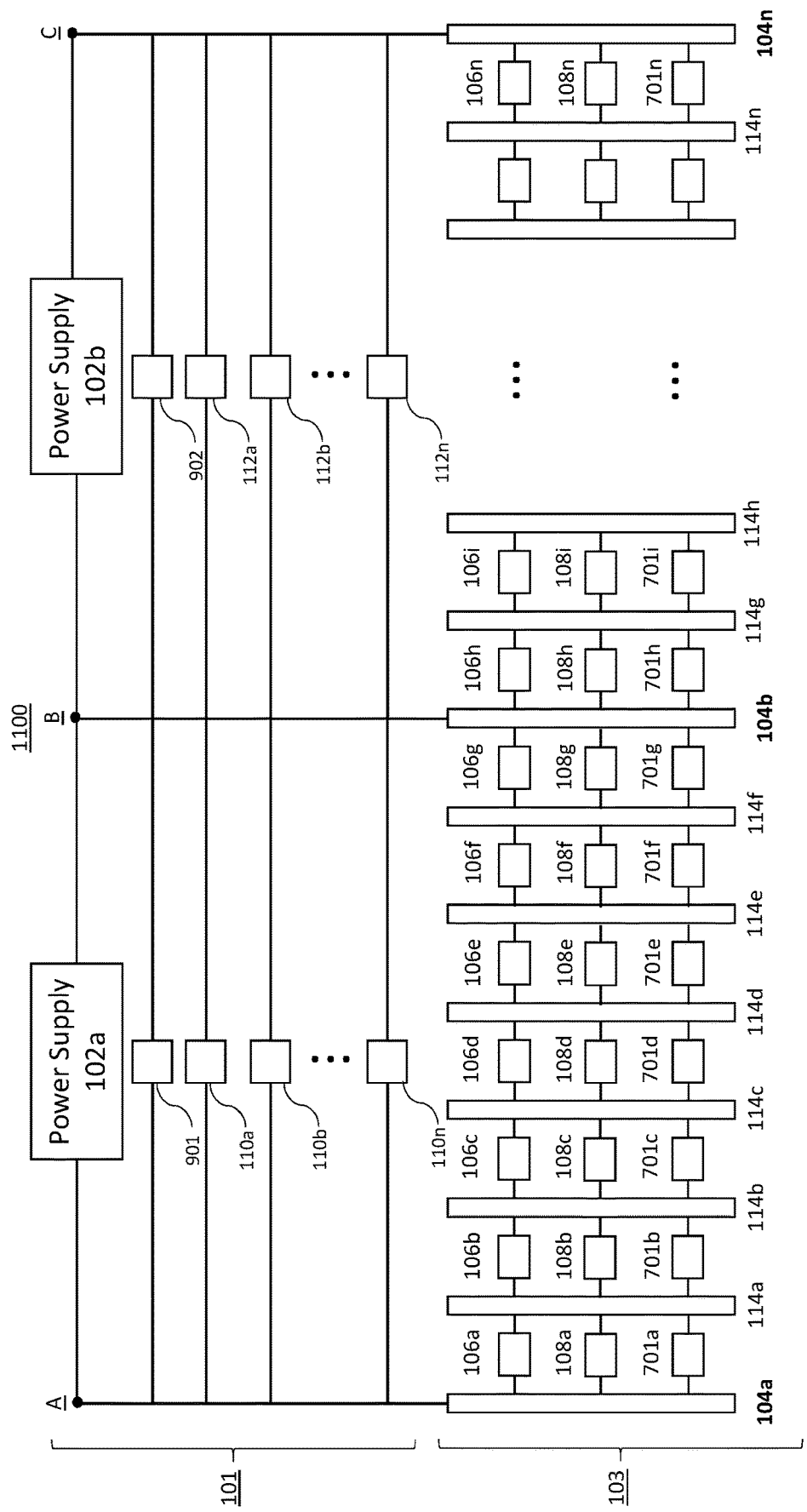
FIG. 11 is another system for protecting high-voltage power supplies in an accelerator, according to some embodiments of the present disclosure.

FIG. 11 is another system 1100 for protecting a high-voltage power supply system in an accelerator, according to some embodiments of the present disclosure. System 1100 can include a combination of various components described in FIGS. 1, 7, and 9. In some embodiments, system 1100 can include a plurality of MOVs 106a-n, a plurality of electrical insulators 108a-n, a plurality of water resistors 701a-n, and a plurality of power-supply-side MOVs 901 and 902. Similar to as described in previous figures, MOVs 106, electrical insulators 108, and water resistors 701 can be connected in parallel between electrodes and can offer protection from electrical breakdown and/or electrical flashover during overvoltage events. Water resistors 701 can also assist with voltage grading within the insulators 108.

Figure 12:
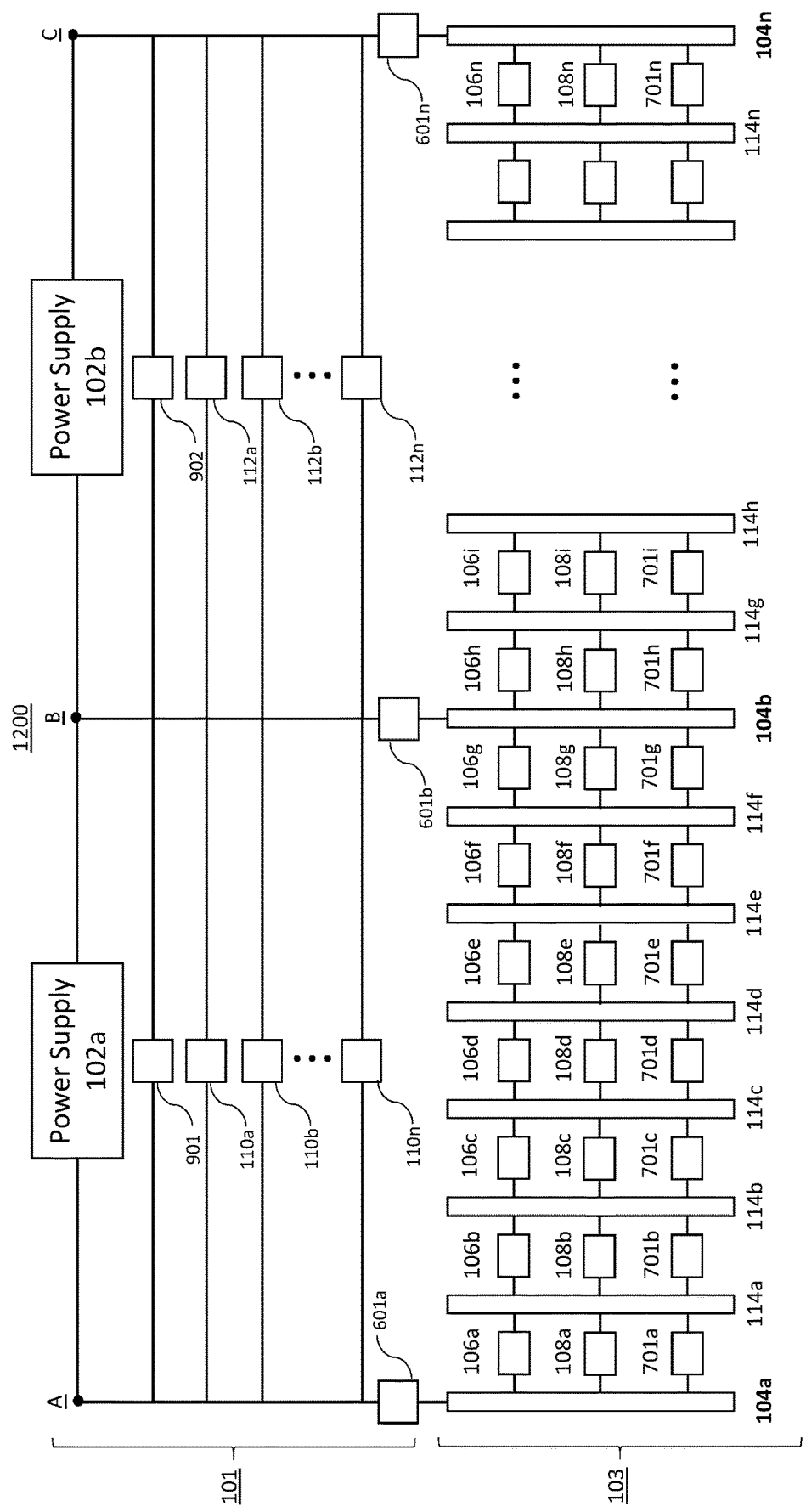
FIG. 12 is another system for protecting high-voltage power supplies in an accelerator, according to some embodiments of the present disclosure.

FIG. 12 is another system 1200 for protecting a high-voltage power supply system in an accelerator, according to some embodiments of the present disclosure. System 1200 can include similar components to those described in FIG. 11, but may also include a plurality of power resistors 601a-n. In some embodiments, power resistors 601 can operate similar to or the same as described in relation to FIG. 6. Each power resistor 601 can be electrically positioned between a voltage-setting electrode 104 and the associated power supply. For example, power resistor 601b can be positioned between voltage-setting electrode 104b and power supply 102a (the power supply that supplies the voltage level to voltage-setting electrode 104b). In some embodiments, during an overvoltage event, each power resistor 601 can hold off the voltage surge between the accelerator structure 101 and the acceleration tube 103. A power resistor is typically designed to withstand and dissipate large amounts of power and can include materials with high thermal conductivities.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. An over-voltage protection system for an accelerator comprising:
a plurality of DC power supplies configured to provide a plurality of voltage levels up to a desired voltage level; and
an acceleration tube electrically connected to the plurality of DC power supplies and configured to accelerate a charged particle, the acceleration tube comprising a plurality of stages, each stage comprising:
a plurality of electrodes, wherein one electrode of the plurality of electrodes is electrically coupled to a voltage level of the plurality of voltage levels; and
a plurality of varistors configured to discharge energy in response to an overvoltage event;
wherein the plurality of electrodes and the plurality of varistors are electrically coupled to each other and arranged in an alternating fashion;
wherein each stage comprises a plurality of insulators, each insulator being arranged in parallel with a varistor.

2. The over-voltage protection system of claim 1, wherein each stage comprises a plurality of water resistors, each water resistor being arranged in parallel with a varistor and an insulator.

3. The over-voltage protection system of claim 1, wherein each varistor is connected between an output of a power supply and a relative ground of the power supply.

4. The over-voltage protection system of claim 1, wherein each varistor is a metal oxide varistor.

5. The over-voltage protection system of claim 1, wherein each varistor comprises a varistor assembly, the varistor assembly comprising a linear stack of varistor elements.

6. The over-voltage protection system of claim 5, wherein each varistor element is disk-shaped.

7. The over-voltage protection system of claim 1, wherein each DC power supply of the plurality of DC power supplies is connected in parallel with a varistor.

8. The over-voltage protection system of claim 1, wherein each DC power supply of the plurality of DC power supplies comprises a Cockcroft-Walton multiplier.

9. The over-voltage protection system of claim 1, wherein each DC power supply of the plurality of DC power supplies is connected in series.

10. The over-voltage protection system of claim 1, wherein each varistor comprises a threshold voltage, wherein each varistor is configured to, in response to a voltage across the varistor surpassing the threshold voltage, limit current from reaching a DC power supply.

11. The over-voltage protection system of claim 10, wherein limiting current from reaching the DC power supply comprises discharging energy stored in at least one capacitor within the plurality of DC power supplies.

12. A protection system for an accelerator comprising:
a plurality of DC power supplies configured to provide a plurality of voltage levels up to a desired voltage level;
a plurality of varistors, wherein each varistor of the plurality of varistors is connected in parallel with a DC power supply; and
an acceleration tube electrically connected to the plurality of DC power supplies and configured to accelerate a charged particle, the acceleration tube comprising a plurality of stages, each stage comprising:
a plurality of electrodes, wherein one electrode of the plurality of electrodes is electrically coupled to a voltage level of the plurality of voltage levels;
a plurality of insulators; and
a plurality of water resistors configured to discharge energy in response to an overvoltage event and grade voltage across the plurality of insulators;
wherein the plurality of insulators and the plurality of water resistors are electrically in parallel.

13. The protection system of claim 12, wherein each varistor comprises a varistor assembly, the varistor assembly comprising a linear stack of varistor elements.

14. The protection system of claim 12, wherein each DC power supply comprises a Cockcroft-Walton multiplier.

15. The protection system of claim 12, wherein each varistor comprises a threshold voltage, wherein each varistor is configured to, in response to a voltage across the varistor surpassing the threshold voltage, discharge energy stored in at least one capacitor within the plurality of DC power supplies.

16. A method for protecting components of an accelerator comprising:
providing, via a plurality of DC power supplies, a plurality of voltage levels up to a desired voltage level;
accelerating, via an acceleration tube electrically connected to the plurality of DC power supplies, one or more charged particles, wherein the acceleration tube comprises a plurality of stages, each stage comprising:
a plurality of electrodes, wherein one electrode of the plurality of electrodes is electrically coupled to a voltage level of the plurality of voltage levels; and a plurality of varistors configured to discharge energy in response to an overvoltage event;

wherein the plurality of electrodes and the plurality of varistors are electrically coupled to each other and arranged in an alternating fashion;

wherein each stage comprises a plurality of insulators, wherein each insulator is arranged in parallel with a varistor; and discharging, via the plurality of varistors, energy stored in at least one capacitor within the plurality of DC power supplies.

17. The method of claim 16, wherein discharging energy stored in at least one capacitor within the plurality of DC power supplies occurs in response to an overvoltage event.

18. The method of claim 16, wherein each varistor comprises a varistor assembly, the varistor assembly comprising a linear stack of varistor elements.

* * * * *